United States Patent
Pauthier et al.

(10) Patent No.: US 9,045,106 B2
(45) Date of Patent: Jun. 2, 2015

(54) SAFETY DEVICE FOR VEHICLE

(71) Applicant: Faurecia Interieur Industrie, Nanterre (FR)

(72) Inventors: Fabrice Pauthier, L'Isle-Adam (FR); Thierry Schupbach, Saint Crepin Ibouvilliers (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/312,792

(22) Filed: Jun. 24, 2014

(65) Prior Publication Data

US 2014/0375029 A1  Dec. 25, 2014

(51) Int. Cl.
- *B60R 21/215* (2011.01)
- *B29C 45/14* (2006.01)
- *B29C 45/16* (2006.01)
- B29L 31/30 (2006.01)

(52) U.S. Cl.
CPC ............ *B60R 21/215* (2013.01); *B29C 45/14* (2013.01); *B29L 2031/3038* (2013.01); *B60R 2021/21537* (2013.01); *B29C 45/1671* (2013.01)

(58) Field of Classification Search
CPC ............ B60R 21/205; B60R 21/215; B60R 2021/21537; B29L 2031/2038; B29C 45/14; B29C 45/1671
USPC .................................. 280/728.2, 728.3, 732
See application file for complete search history.

(56) References Cited

U.S. PATENT DOCUMENTS

| | | | |
|---|---|---|---|
| 6,623,029 B2 * | 9/2003 | Sun et al. ................ | 280/728.2 |
| 7,210,700 B2 * | 5/2007 | Zagrodnicki et al. ...... | 280/728.3 |
| 8,403,357 B2 * | 3/2013 | Choi ..................... | 280/728.2 |
| 2005/0127641 A1 * | 6/2005 | Cowelchuk et al. ....... | 280/728.3 |
| 2006/0017268 A1 * | 1/2006 | Bondoerffer ............ | 280/732 |
| 2006/0043701 A1 * | 3/2006 | Zagrodnicki et al. ...... | 280/728.3 |
| 2007/0080521 A1 * | 4/2007 | Leserre et al. .......... | 280/728.3 |
| 2010/0109067 A1 * | 5/2010 | Kim et al. .............. | 257/316 |
| 2011/0109067 A1 | 5/2011 | Le Hoang et al. | |
| 2011/0109297 A1 * | 5/2011 | Tosuntikool ............. | 323/350 |
| 2011/0133509 A1 * | 6/2011 | Iida et al. ............. | 296/70 |

(Continued)

FOREIGN PATENT DOCUMENTS

| | | |
|---|---|---|
| DE | 102006035208 A1 | 1/2008 |
| DE | 102007053995 A1 | 5/2009 |

(Continued)

OTHER PUBLICATIONS

French Search Report Application No. 13 56016 report dated on Jun. 24, 2013.

*Primary Examiner* — Paul N Dickson
*Assistant Examiner* — Robert A Coker
(74) *Attorney, Agent, or Firm* — Miller, Matthias & Hull LLP

(57) ABSTRACT

A safety device for a vehicle, adapted to be arranged facing an airbag, comprising:
  a chute channel defining a recess to receive the airbag,
  a net comprising a first portion and a second portion, and
  a flap at least partially covering the recess, the flap being overmolded onto the first portion of the net. The device further comprises a strip overmolded onto the second portion of the net, and the chute channel is overmolded onto the strip. A safety system and dashboard comprising such a safety device, as well as a method for manufacturing such a safety device.

17 Claims, 4 Drawing Sheets

(56) References Cited

U.S. PATENT DOCUMENTS

Figure 1:
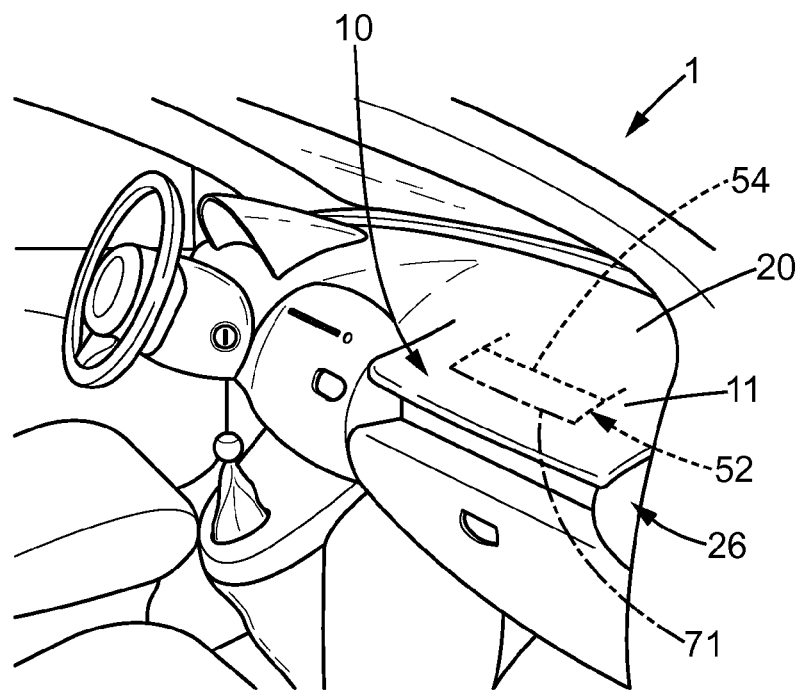

| | | |
|---|---|---|
| 2011/0181028 A1 | 7/2011 | Brunet |
| 2012/0126514 A1 | 5/2012 | Choi |
| 2013/0001931 A1* | 1/2013 | Evans ................ 280/728.2 |

FOREIGN PATENT DOCUMENTS

| | | |
|---|---|---|
| EP | 2006165 A1 | 12/2008 |
| EP | 2334520 A1 | 6/2011 |
| FR | 2902727 A1 | 12/2007 |
| FR | 2902728 A1 | 12/2007 |
| FR | 2929569 A1 | 10/2009 |
| FR | 2935933 A1 | 3/2010 |
| FR | 2935940 A1 | 3/2010 |
| FR | 2970921 A1 | 8/2012 |
| WO | WO 2005/068268 A2 | 7/2005 |
| WO | WO 2010/037915 A1 | 4/2010 |
| WO | WO 2012/051738 A1 | 4/2012 |
| WO | WO2012051738 A1 * | 4/2012 |

* cited by examiner

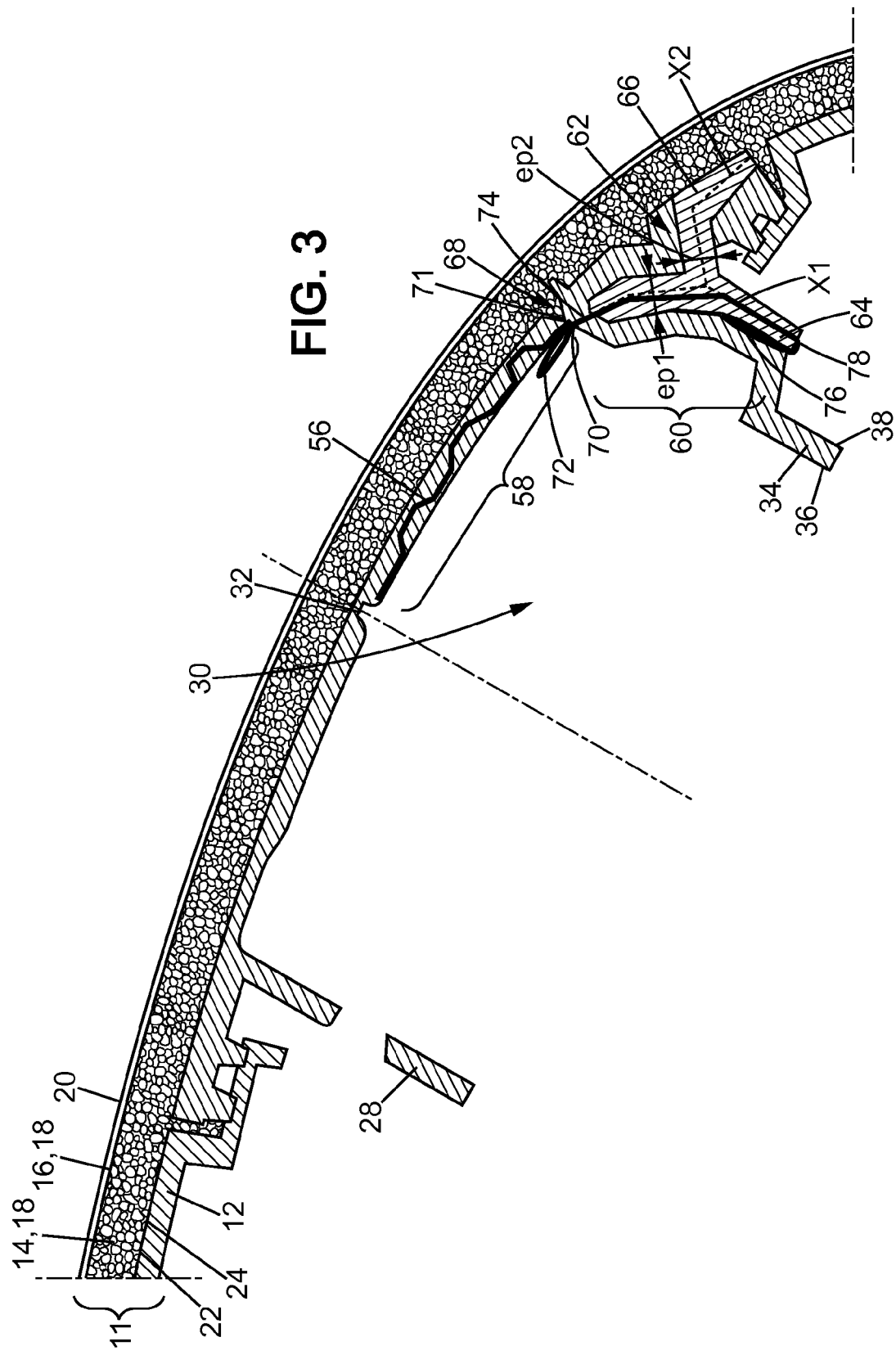

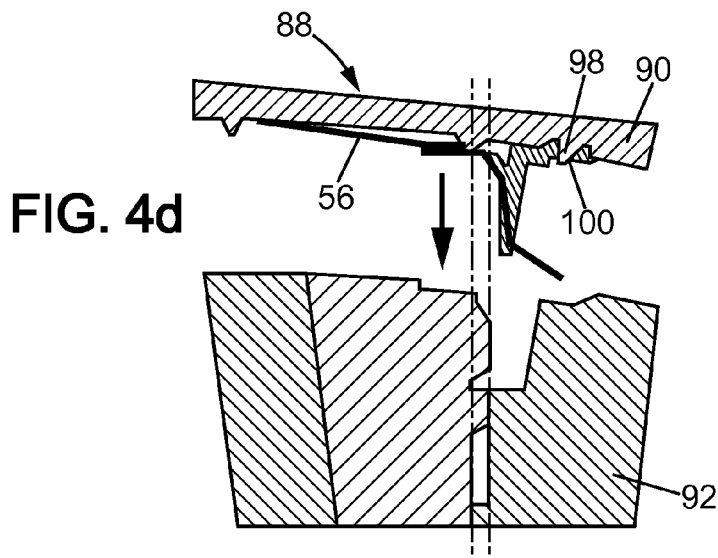
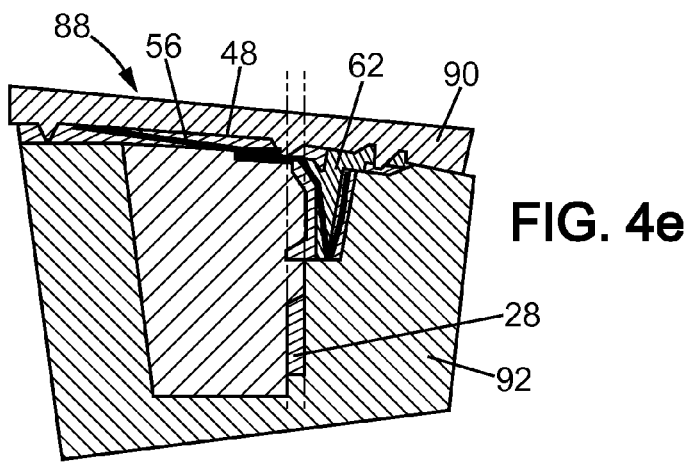
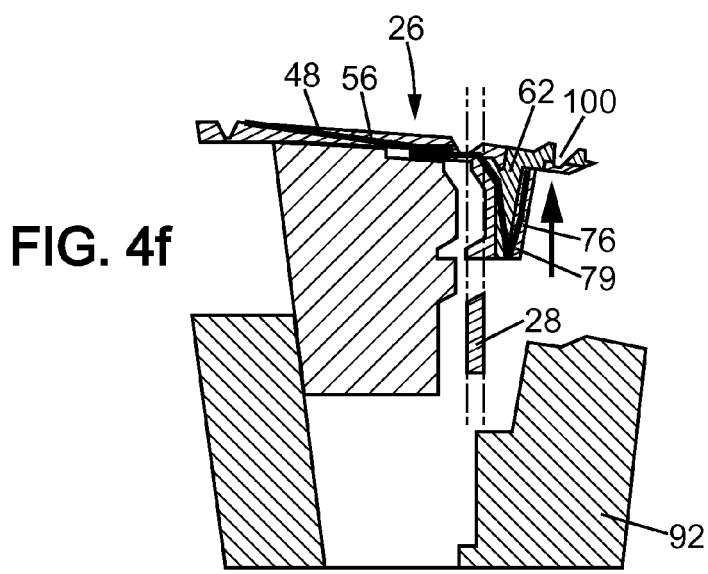

SAFETY DEVICE FOR VEHICLE

CROSS-REFERENCE TO RELATED APPLICATIONS

This application claims priority under the Paris Convention to the French Patent Application No. 13 56016, filed on Jun. 24, 2013.

FIELD OF THE DISCLOSURE

The present invention relates to safety devices for vehicles, adapted to be arranged facing an airbag.

Already conventionally known is a safety device adapted to be arranged facing an airbag, comprising:
a chute channel defining a recess to receive the airbag,
a net comprising a first portion and a second portion, and
a flap at least partially covering the recess, the flap being overmolded onto the first portion of the net.

BACKGROUND OF THE DISCLOSURE

Document FR2902727 describes an example of such a safety device arranged within a vehicle dashboard. In that document, the chute channel is integral with a fixed portion of the dashboard and the flap is integral with a cover connected to the fixed portion of the dashboard by means of a line of least resistance. The assembly formed by the flap and the cover is destined to separate from the fixed portion of the dashboard and from the chute channel when the airbag deploys through the opening delimited by the chute channel, along this line of least resistance. The flexible net extending between an attachment member integral with the chute channel and the flap retains the assembly formed by the flap and cover relative to the fixed portion of the dashboard when the airbag deploys, preventing the assembly from being freely ejected into the vehicle interior as a result of this deployment, which could cause further injury to the vehicle occupants.

However, there is a constant need to improve such devices, especially their dependability.

The present invention is intended to meet this objective.

SUMMARY OF THE DISCLOSURE

In the invention, a device of the kind in question is characterized in that it further comprises a strip overmolded onto the second portion of the net, and in that the chute channel is overmolded onto the strip.

Through these arrangements, the net is sturdily secured to the chute channel without complicated or expensive manufacturing required for the safety device. It also provides greater reliability for the flap retention.

In preferred embodiments of the invention, one or more of the following arrangements may be used:
the chute channel comprises a side wall and a transverse wall, and the side wall and/or the transverse wall of the chute channel is overmolded onto the strip;
the side wall and the transverse wall of the chute channel each comprise an inner surface, for example oriented towards the recess, and an outer surface opposite said inner surface, and the strip is on the outer face of the side wall of the chute channel and/or on the inner or outer surface of the transverse wall of the chute channel, which provides an additional point of retention for the strip and increases the sturdiness of the assembly;
the chute channel is made of a first material, and the strip is made of a second material, the second material being more rigid than the first material. As the strip is an element that is attached to the chute channel, designing the strip to be of a different material than that of the chute channel does not pose any particular problems in the implementation. Furthermore, creating the strip from a more resistant material than that of the chute channel provides reliable retention of the net in the strip without increasing manufacturing costs;
the net has a thickness, the chute channel is connected to the flap by an intermediate portion overmolded onto a third portion of the net,
the intermediate portion has an intermediate thickness, said intermediate thickness is greater than the net thickness, and the safety device has a continuous or discontinuous line of least resistance facing the intermediate portion, adapted to break when the airbag is deployed from the recess. The net forms a connecting loop between the flap and the inner surface of the side wall of the chute channel. The intermediate portion thus allows the flap to seal the chute channel when the flap covers the recess, while ensuring that minimal forces oppose the release of the flap when the airbag is deployed;
the net further comprises a fourth portion, the second portion of the net being between the first portion and the fourth portion, the second portion of the net and the fourth portion of the net are connected to each other by an elbow connection, and the fourth portion of the net is arranged outside the strip and facing said strip. The elbow between the second portion and the fourth portion allows folding the net and reducing the sliding of the net from out of the strip, and thus increases safety by preventing uncontrolled release of the flap, for example into the passenger area of a vehicle.

The present invention further provides a safety system comprising a safety device as described above and an interior trim element. The interior trim element comprises:
a covering having an outer face and an inner face opposite the outer face,
a rigid support having an outer face and an inner face opposite the outer face, with the outer face of the rigid support facing the inner face of the covering, and the strip comprises first and second arms of substantially constant thicknesses, the first arm extending in a first arm direction, the second arm extending in a second arm direction, the first arm direction and the second arm direction forming a non-zero angle. The first arm is overmolded onto the second portion of the net, and the second arm of the strip is sandwiched between the inner face of the covering and the outer face of the transverse wall or of the rigid support.

These arrangements reinforce the retention or the maintaining in position of the strip, without requiring an extensive attachment area.

In an additional possible arrangement, an attachment portion, forming a one-piece assembly integrated with the chute channel, is arranged between the second arm of the strip and the outer face of the rigid support. This arrangement reinforces the maintaining of the strip and consequently the retention of the flap when the airbag is deployed. Here again, the retention or the maintaining in position of the strip is reinforced.

The present invention also relates to a dashboard for a vehicle, comprising a safety device as described above, an interior trim element forming a dashboard body, with the safety device being secured to an inner or outer surface of the dashboard body, and an airbag arranged in the recess of the safety device.

Lastly, the present invention concerns a manufacturing method, in particular for a safety device as described, comprising the steps of:
- providing a net,
- manufacturing a strip while overmolding the strip onto a second portion of the net,
- manufacturing a chute channel defining a recess adapted to receive an airbag, while overmolding the chute channel onto the strip, and
- manufacturing a flap while overmolding the flap onto a first portion of the net.

With these arrangements, the manufacture of the device requires a reduced number of steps, which are also of the same category: molding.

According to an additional arrangement, the steps of manufacturing the chute channel and manufacturing the flap and overmolding the flap in the manufacturing process are performed in a single molding step. This reduces the manufacturing time.

Other features and advantages of the invention will be apparent from the following description of one of its embodiments given by way of non-limiting example, with reference to the accompanying drawings.

Figure 2:
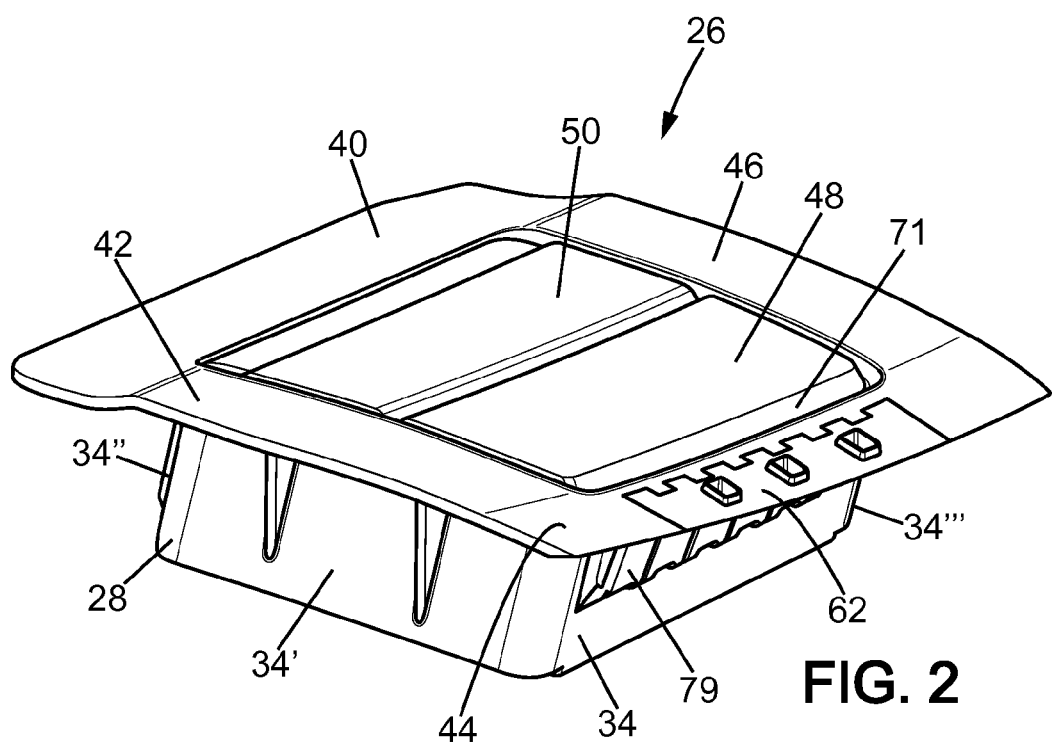

In the drawings:

FIG. 1 is a schematic perspective view of the passenger recess of a vehicle, equipped with a dashboard comprising a safety device according to the invention, FIG. 2 is a perspective view of the safety device of FIG. 1, FIG. 3 is a schematic cross-sectional view of a dashboard comprising a safety device according to an alternative embodiment of the invention, FIGS. 4a to 4f are cross-sectional views of successive steps in manufacturing a safety device according to a second alternative embodiment of the invention.

In the different figures, the same references are used to denote identical or similar elements.

DETAILED DESCRIPTION OF THE DISCLOSURE

FIG. 1 schematically represents the interior of a vehicle 1 equipped with a piece of interior trim for a vehicle.

In this case, the piece of interior trim is a dashboard 10. However, in alternative embodiments, the interior trim of the vehicle could be a door panel, a roof liner, a seat, or any other type of trim equipping the interior of a vehicle.

Advantageously, the dashboard 10 is a "foam-padded" dashboard and includes, as shown in FIG. 3, a dashboard body 11 comprising a rigid support layer 12, a foam layer 14, and a skin 16 covering the foam layer. The skin 16 and the foam layer 14 form a covering 18 for the rigid support 12.

The skin 16 is on the side intended to face the vehicle interior. The skin 16 comprises an outer surface, said outer surface being visible from the passenger recess and forming the outer surface 20 of the covering 18. The covering 18 also comprises an inner surface 22, opposite the outer surface 20. The inner surface 22 is facing the rigid support layer 12. More specifically, the inner surface 22 of the covering 18 is facing an outer surface 24 of the rigid support 12.

The rigid support 12 is, for example, composed of an insert made of rigid plastic.

In alternative embodiments, the dashboard could be an "injection-molded" dashboard composed of a dashboard body constituting the sole element of the dashboard, or could be "thermo-covered", comprising a self-tearing skin covering the dashboard body.

A safety device 26 is mounted under the dashboard body. More specifically, the safety device 26 is arranged between the dashboard body and an airbag (not shown).

As represented in FIGS. 2 and 3, the safety device 26 comprises a chute channel 28 adapted to receive the airbag. The chute channel 28 defines a recess 30. The recess 30 is adapted to receive the airbag. In a known manner, during the rapid inflation of the airbag after an impact to the vehicle, the airbag is deployed through an opening 32 of the recess 30, into the passenger recess.

The chute channel 28 comprises a side wall 34. The chute channel further comprises a second, third and fourth side walls 34', 34", 34'" defining the recess 30. Side wall 34 comprises an inner surface 36 facing into the recess 30. The sidewall further comprises an outer surface 38 opposite the inner surface 36. Here, and as shown in FIG. 2, the chute channel comprises transverse walls 40, 42, 44 and 46 extending substantially parallel to the covering 18 or to the rigid support 12. Each of the transverse walls 40, 42, 44, 46 comprises an outer surface facing the covering 18 or the rigid support 12, and an inner surface, opposite said outer surface. The chute channel 28 is made of a first material, for example of a thermoplastic elastomer (also called TPE) which has particularly attractive elastic properties that reduce the risk of the chute channel breaking when subjected to considerable stresses. Other materials may be used, however.

The safety device 26 includes a flap 48. The flap 48 at least partially covers the opening 32 of the recess 30. In "normal" use of the vehicle, meaning in the absence of impacts, the flap 48 closes the opening 32 of the recess 30. When an impact occurs, the airbag inflates, comes into contact with the flap 48, and causes the flap 48 to open. The flap 48 is connected to the chute channel 28 by a connecting hinge which allows the flap 48 to pivot relative to the chute channel 28 and restricts the release of the flap 48 into the passenger recess 1. In an embodiment, the flap may be made of the same material as the chute channel, for example TPE. However, in an alternative embodiment another material is possible.

The safety device further comprises a net 56 that is preferably flexible. The net 56 is assembled to the flap 48 and to the chute channel 28 and forms the connecting hinge between these two bodies. More specifically, the net 56 forms a connecting loop 72 between the flap 48 and the chute channel 28, which acts as a hinge. During airbag deployment, the flap 48 swings into the passenger recess 1 of the vehicle about a transverse non-fixed axis formed by the loop 72, which provides greater freedom of movement, less stress on the flap 48, less risk of the flap breaking, and consequently a reduced risk of pieces flying into the passenger recess. In addition, the loop 72 provides easy adjustment of the hinge length.

The net 56 may be of textile or metal or any sufficiently strong material. The term "net" means any flexible material in a thin layer, for example woven or knitted. The net 56 is made, for example, of aromatic polyamide (also called "Aramid"), which has good mechanical strength. Other materials may additionally or alternatively be used, however. The net 56 has a thickness of about one millimeter.

The flap 48 is overmolded onto the net 56. Specifically, the net 56 comprises a first portion 58 and a second portion 60, and the flap 48 is overmolded onto the first portion 58 of the net 56. In other words, the first portion 58 of the net 56 is embedded in the flap 48. The first portion 58 of the net 56 is thus integral with the flap 48. Optionally, and as illustrated in FIG. 3, the flap is overmolded onto the net 56 on the surface of the flap. In other words, the first portion 58 of the net 56 is embedded into the thickness of the flap 48, on the surface of the flap 48.

The safety device 26 comprises a strip 62, and the strip 62 is overmolded onto the second portion 60 of the net 58. In other words, the second portion 60 of the net 58 is embedded in the strip 62. The second portion 60 of the net 58 is thus integral with the strip 62.

For example, the strip 62 is made in another material than the material of the flap 48. Thus, in an embodiment, as shown in the figures, the chute channel 28 and the flap 48 are made in a first material, whereas the strip 62 is made in a second material.

As illustrated in FIG. 3, the strip 62 has a substantially Y-shaped cross-section. In other words, the strip 62 comprises a first arm 64 and a second arm 66. The second arm 66 is connected to the first arm 64. More specifically, the first arm 64 extends in a first arm direction X1. The second arm extends in a second arm direction X2. The first arm direction X1 forms a non-zero angle with the second arm direction X2. As illustrated in FIG. 3, the first arm 64 has a substantially constant first thickness ep1. The second arm 66 has a substantially constant second thickness ep2. In this example, the first thickness ep1 and the second thickness ep2 are substantially similar.

However, in an alternative embodiment the strip 62 may have other shapes, and for example have a circular or square cross-section.

As represented in FIG. 3, the first arm 64 of the strip 62 is overmolded onto the second portion 60 of the net 56. In other words, the second portion 60 of the net 56 is embedded into the first arm 64 of the strip 62.

The strip 62 is separated from the flap 48. In other words, the strip 62 is not mono block with the flap 48. The strip 62 is distant from the flap 48.

The side wall 34 of the chute channel 28 is overmolded onto the strip 62. More specifically, the strip is on the outer surface 38 of the side wall 34 of the chute channel 28. As represented in FIG. 3, a portion of the side wall 34 of the chute channel 28 is overmolded onto the first arm 64.

Additionally or alternatively to the overmolding of the side wall 34 onto the strip 62, the transverse wall 40, 42, 44, 46 is overmolded onto the strip 62. A portion of the transverse wall of the chute channel 28 is overmolded onto the second arm 66. For example, the first arm 64 of the strip 62 is on the outer surface of the side wall 34 and/or the second arm 66 of the strip 62 is on the inner or outer surface of the transverse wall of the chute channel 28.

The side wall 34 of the chute channel 28 is connected to the flap 48 by an intermediate portion 68. The intermediate portion 68 has an intermediate thickness and is overmolded onto a third portion 70 of the net 56. The intermediate thickness is greater than the thickness of the net.

The safety device 26 further comprises a line of least resistance 71. The line of least resistance 71 is continuous. For example, the line of least resistance 71 is formed by a notch or a continuous groove. In an alternative embodiment, the line of least resistance is discontinuous. For example, the line of least resistance 71 is formed by a plurality of discontinuous notches. The line of least resistance 71 is facing the intermediate portion and forms an area intended to tear or break when the airbag deploys after an impact.

In this example and as represented in FIG. 3, the loop 72 is not overmolded and is adjacent to the third portion 70. The loop 72 is located within the recess 30. The loop 72 is, for example, pressed against the inner surface of the flap 48 that faces the recess 30. The loop 72 extends between the flap 48 and the strip 62.

The net 56 traverses the side wall 34 of the chute channel 28.

The net 56 also comprises a fourth portion 76, located between the strip 62 and a portion of the chute channel 28. More specifically, as represented in FIG. 3, the fourth portion 76 is between the strip 62 and the outer surface 38 of the chute channel 28.

In this case, the second portion 60 of the net 56 is located between the first portion 58 and the fourth portion 76 of the net. The second portion 60 of the net 56 and the fourth portion 76 of the net 56 are connected to each other by an elbow 78. The fourth portion 76 is outside the strip, facing said strip 62. For example, the fourth portion 76 is "folded" to one side of the strip, between the strip and the outer surface 38 of the chute channel 28, as illustrated in FIG. 3.

However, in alternative embodiments, the fourth portion 76 can be free and not overmolded, for example the fourth portion 76 of the net 56 can be protruding from the strip with an anti-slippage seam.

As illustrated in FIG. 2, the side wall 34 of the chute channel 28 extends to cover the strip 62 over all its faces. In other words, the first arm 64 of the strip 62 is sandwiched between the side wall 34 and an extension 79 of the side wall. In this embodiment, and as shown for example in FIG. 4f, the fourth portion 76 of the net 56 can be "folded" to the other side of the strip, meaning toward the face of the strip farthest from the side wall 34 of the chute channel 28.

The extension of the side wall 79 may be continuous, meaning it has a constant thickness along its entire surface and covers the entire surface of the first arm 64, as schematically represented in FIG. 4f, or may be discontinuous and have notches, as seen in FIG. 2.

The second arm 66 is in the direction of and faces the inner surface 22 of the covering 18. Optionally, the second arm is attached to the outer surface 24 of the rigid support 12. In another embodiment, the second arm is attached to the inner surface of the rigid support 12, opposite the outer surface 24. The second arm 12 provides additional mechanical retention of the strip 62 and therefore of the net 56 when external stresses exert force on the flap and therefore on the net 56.

Specifically, the second arm is sandwiched between the covering 18 and the rigid support 12. As illustrated in FIG. 3, an attachment portion that is of the same material as the chute channel 28 (in other words forming an one-piece assembly integrated with the chute channel) forms an interface between the strip 62 and the rigid support 12. The attachment portion is attached to the rigid support 12, for example by welding.

FIGS. 4a to 4f schematically illustrate steps in manufacturing the safety device 26 by molding.

Figure 4A:
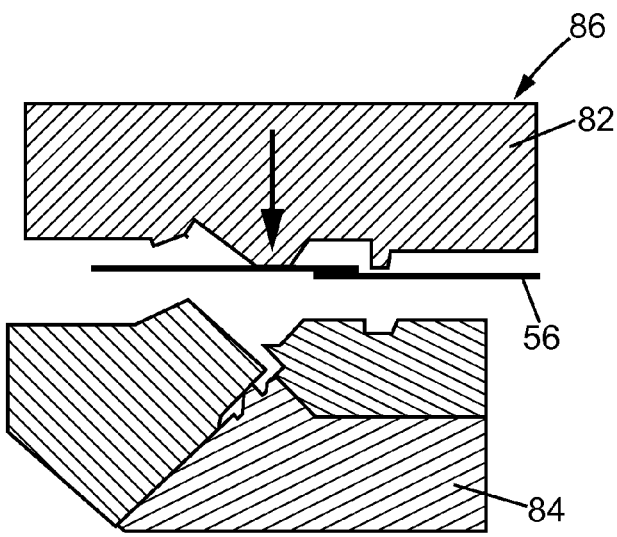

First, as shown in FIG. 4a, the net 56 is between an upper plate 82 and a lower plate 84 of a first mold 86. Preferably the loop 72 is protected beforehand in order to maintain or give the loop, after all the molding steps, the flexibility necessary for it to function as a hinge with no fixed transverse axis.

Figure 4B:
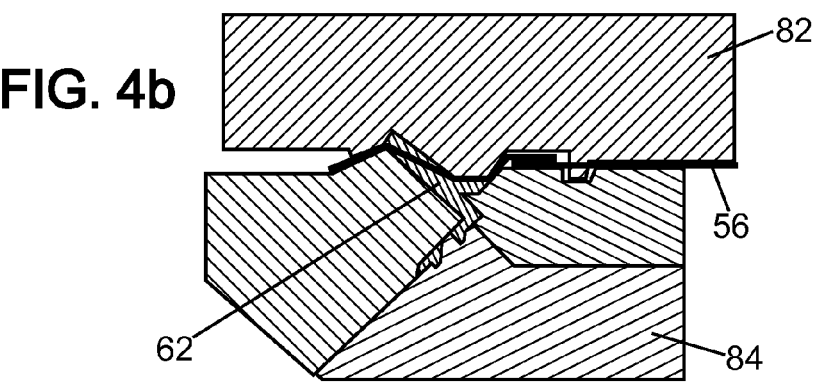

The upper plate 82 is lowered so that is closes the first mold 86. The strip 62 is created by injecting the component material of the strip 62, for example polypropylene reinforced with fibers such as glass fibers known as "PPGF", into the first mold 86 (FIG. 4b).

Figure 4C:
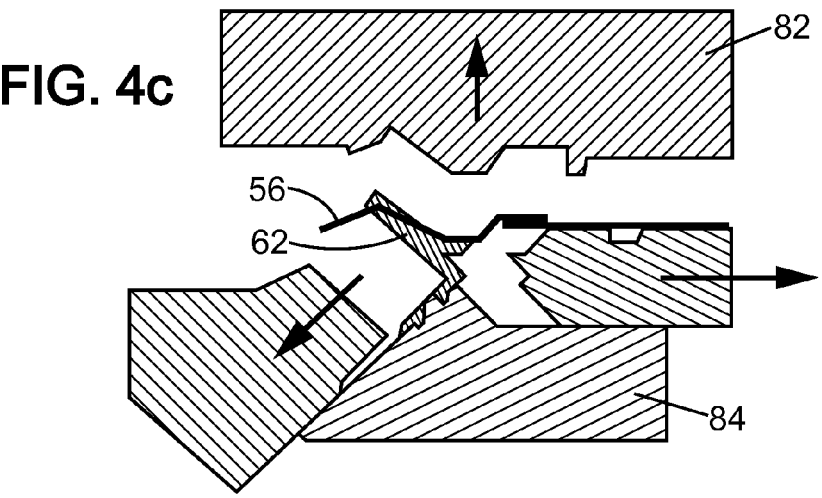

The mold 86 is opened by separating the plates 82, 84 for the part (strip 62 overmolded onto the first portion 58 of the net 56) formed (FIG. 4c).

In a fourth step, represented in FIG. 4d, the part obtained in the previous step (represented in FIG. 4c) is placed in a second mold 88 comprising an upper plate 90 and lower plate 92. Optionally, a catch pin 98 on the upper plate 90 cooperates with a catch hole 100 in the strip 62 in order to secure the strip 62 to the upper plate 90.

A fifth step, represented in FIG. 4e, consists of closing the second mold 88 and injecting the component material for the chute channel and flap into the mold, creating the flap and chute channel while overmolding the flap onto the first net portion and overmolding the side wall 34 of the chute channel 28 onto the strip 62.

Optionally, in an alternative embodiment, the overmolding of the flap and overmolding of the chute channel are done in separate operations.

Lastly, the second mold 88 is opened and the safety device thus produced is extracted, as represented in FIG. 4f.

The safety device 26 is then attached by means of the transverse walls 40 of the chute channel 28. This attachment is accomplished by welding. In an alternative embodiment, the attachment may be accomplished by snapping it into place.

The covering 18 is then placed to cover the assembly formed by the rigid support 12 attached to the safety device 26. The assembly formed by the covering 18, the safety device 26, and the rigid support 12 forms a safety system 94.

The safety system 94 is adapted to have an airbag assembled in the recess 30. The airbag is for example attached to the safety system 94 by means of hooks, for example arranged to cooperate with holes 96 in the side wall 34 of the chute channel 28.

The assembly is adapted to form a dashboard of a vehicle, in which the airbag is deployed when an impact occurs.

As illustrated in FIGS. 2 and 3, the device further comprises a second flap 50. The flap 48 and the second flap 50 are arranged to completely close the opening 30. As illustrated, the flap 48 and the second flap 50 are adjacent to each other and the interface between the two flaps corresponds to a central area 54 of a line of weakness 52 (represented as a dotted line in FIG. 1). In addition, the line of weakness 52 extends along the two sides of the central area 54, forming an H substantially delimiting the two flaps 48, 50.

More specifically, and as represented in FIG. 3, in the case of a "foam-padded" dashboard, there is a continuity of material between the flap 48 and the second flap 50, and the central area 54 of the line of weakness is a thinned area. In other words, there is a bridge of material of about 0.4 mm between the flap 48 and the second flap 50. This bridge of material is needed to prevent foam leakage problems.

In the case of an "injected" dashboard, the flap and the second flap may be connected together by a bridge of material, or may be separate.

The second flap 50 is connected to the chute channel by a hinge connection. As illustrated in FIG. 3, the hinge connection can consist of a film hinge formed by thinning the material forming the interface between the second flap 50 and the chute channel 28 (the second flap 50 and the chute channel 28 being made in one piece (from the same material)).

In this case, and for reasons of size reduction and safety, the second flap 50 is located next to the windshield of the vehicle, while the flap 48 is located toward the passenger side of the vehicle.

However, in an alternative embodiment, the second flap 50 is connected to the chute channel by a hinge connection substantially identical to the one described below for the flap 48. Optionally, the second flap 50 is formed with the chute channel 28 during a single molding step.

In alternative embodiments of the invention, a single flap 48 completely covering the opening 32 of the recess 30 may be provided, and for example the line of weakness may have a U shape.

The invention claimed is:

1. A safety device for a vehicle, adapted to be arranged facing an airbag, comprising:
   a chute channel defining a recess to receive the airbag,
   a net comprising a first portion and a second portion, and
   a flap at least partially covering the recess, the flap being overmolded onto the first portion of the net,
   wherein the safety device further comprises a strip overmolded onto the second portion of the net, and
   wherein the chute channel is overmolded onto the strip, the chute channel being fixed on the strip by overmolding.

2. The safety device according to claim 1, wherein, the chute channel comprising a side wall and a transverse wall, the side wall and/or the transverse wall of the chute channel is overmolded onto the strip.

3. The safety device according to claim 2, wherein
   the side wall and the transverse wall of the chute channel each comprises an inner surface and an outer surface opposite said inner surface, and
   the strip is on the outer surface of the side wall and/or on the inner or outer surface of the transverse wall of the chute channel.

4. The safety device according to claim 2, wherein the net passes through the side wall of the chute channel.

5. The safety device according to claim 1, wherein the chute channel is made of a first material and the strip is made of a second material, the second material being more rigid than the first material.

6. The safety device according to claim 1, wherein the flap is made of a third material, wherein the strip is made of a second material, and wherein the third material is different from the second material.

7. The safety device according to claim 1, wherein the chute channel and the flap are made of a first material, wherein the strip is made of a second material, and wherein the first material is different from the second material.

8. The safety device according to claim 1, wherein the strip is separated from the flap.

9. The safety device according to claim 1, wherein the strip is distant from the flap.

10. The safety device according to claim 1, wherein
    the net has a thickness,
    the chute channel is connected to the flap by an intermediate portion overmolded onto a third portion of the net,
    the intermediate portion has an intermediate thickness,
    said intermediate thickness is greater than the net thickness, and
    the safety device has a line of least resistance that is continuous or discontinuous and faces the intermediate portion, adapted to break when the airbag is deployed from the recess,
    and wherein the net forms a connecting loop between the flap and the inner surface of the side wall of the chute channel.

11. The safety device according to claim 10, wherein the loop extends between the flap and the strip.

12. The safety device according to claim 10, wherein the loop is not overmolded.

13. The safety device according to claim 1, wherein the net further comprises a fourth portion, the second portion of the net being between the first portion and the fourth portion, the second portion of the net and the fourth portion of the net are connected to each other by an elbow connection, and the fourth portion of the net is arranged outside the strip and facing said strip.

14. A manufacturing method, for a safety device according to claim 1, comprising the steps of:
- providing a net,
- manufacturing a strip while overmolding the strip onto a second portion of the net,
- manufacturing a chute channel defining a recess adapted to receive an airbag, while overmolding the chute channel onto the strip, and
- manufacturing a flap while overmolding the flap onto a first portion of the net.

15. the method according to claim 14, wherein the steps of manufacturing the chute channel and manufacturing the flap are performed in a single molding step.

16. A safety system comprising:
- a safety device for a vehicle, adapted to be arranged facing an airbag, comprising:
  - a chute channel defining a recess to receive the airbag,
  - a net comprising a first portion and a second portion, and
  - a flap at least partially covering the recess, the flap being overmolded onto the first portion of the net,
  - wherein the safety device further comprises a strip overmolded onto the second portion of the net, and wherein the chute channel is overmolded onto the strip, and
- an interior trim element comprising:
  - a covering having an outer face and an inner face opposite the outer face, and
  - a rigid support having an outer face and an inner face opposite the outer face,
  - with the outer face of the rigid support facing the inner face of the covering, and wherein
- the strip comprises first and second arms of substantially constant thicknesses, the second arm connecting to the first arm,
- the first arm is overmolded onto the second portion of the net, and
- the second arm of the strip is sandwiched between the inner face of the covering and an outer face of a transverse wall or of the rigid support.

17. A dashboard for a vehicle, comprising:
- a safety device for a vehicle, adapted to be arranged facing an airbag, comprising:
- a chute channel defining a recess to receive the airbag,
- a net comprising a first portion and a second portion, and
- a flap at least partially covering the recess, the flap being overmolded onto the first portion of the net,
- wherein the safety device further comprises a strip overmolded onto the second portion of the net, and wherein the chute channel is overmolded onto the strip, the chute channel being fixed on the strip by overmolding, and
- an interior trim element forming a dashboard body, with the safety device being secured to an inner or outer surface of the dashboard body, and an airbag arranged in the recess of the safety device.

* * * * *